United States Patent
Heidari et al.

(10) Patent No.: US 9,347,321 B2
(45) Date of Patent: May 24, 2016

(54) METHODS FOR OPTIMIZED ENGINE BALANCING BASED ON FLIGHT DATA

(71) Applicant: The Boeing Company, Chicago, IL (US)

(72) Inventors: Mohammad Ali Heidari, Bellevue, WA (US); Micah D. Druckman, Seattle, WA (US); Omid B. Nakhjavani, Mill Creek, WA (US)

(73) Assignee: THe Boeing Company, Chicago, IL (US)

( * ) Notice: Subject to any disclaimer, the term of this patent is extended or adjusted under 35 U.S.C. 154(b) by 42 days.

(21) Appl. No.: 14/449,183

(22) Filed: Aug. 1, 2014

(65) Prior Publication Data

US 2016/0032725 A1 Feb. 4, 2016

(51) Int. Cl.
| | |
|---|---|
| *F01D 5/02* | (2006.01) |
| *F01D 5/10* | (2006.01) |
| *F01D 21/00* | (2006.01) |
| *B64D 35/02* | (2006.01) |
| *G01M 1/20* | (2006.01) |
| *G01M 1/22* | (2006.01) |
| *G01M 1/32* | (2006.01) |
| *G01M 1/34* | (2006.01) |
| *G05B 23/02* | (2006.01) |
| *B64C 17/00* | (2006.01) |
| *B64C 27/00* | (2006.01) |

(52) U.S. Cl.
CPC ............... *F01D 5/027* (2013.01); *B64D 35/02* (2013.01); *F01D 5/10* (2013.01); *F01D 21/003* (2013.01); *G01M 1/20* (2013.01); *G01M 1/22* (2013.01); *G01M 1/32* (2013.01); *G01M 1/34* (2013.01); *G05B 23/024* (2013.01); *B64C 17/00* (2013.01); *B64C 27/001* (2013.01); *F05D 2220/323* (2013.01); *F05D 2270/334* (2013.01)

(58) Field of Classification Search
CPC ..... F01D 5/027; B64D 35/02; F05D 2220/323; G01M 1/20; G01M 1/22; G01M 1/32; G01M 1/34; B64C 17/00; B64C 27/001; G05B 23/024
USPC ............................ 701/3, 33.1, 124; 700/279
See application file for complete search history.

(56) References Cited

U.S. PATENT DOCUMENTS

| | | | |
|---|---|---|---|
| 4,098,127 A | 7/1978 | Shiga et al. | |
| 4,485,678 A | 12/1984 | Fanuele | |
| 5,172,325 A | 12/1992 | Heidari | |
| 5,586,065 A | 12/1996 | Travis | |
| 6,027,239 A * | 2/2000 | Ghassaei | G01H 1/003 244/1 N |
| 6,711,952 B2 | 3/2004 | Leamy et al. | |
| 7,243,023 B2 | 7/2007 | Skilton | |
| 7,321,809 B2 | 1/2008 | Vian et al. | |
| 7,363,111 B2 * | 4/2008 | Vian | G05B 23/024 700/279 |
| 7,371,042 B2 | 5/2008 | Lee | |
| 7,400,943 B2 * | 7/2008 | Vian | G05B 23/024 700/279 |
| 8,313,279 B2 | 11/2012 | Mollmann | |
| 2013/0149130 A1 | 6/2013 | Hasting et al. | |

* cited by examiner

*Primary Examiner* — Russell Frejd

(74) *Attorney, Agent, or Firm* — Ostrager Chong Flaherty & Broitman P.C.

(57) ABSTRACT

Methods for balancing rotating machinery, such as gas turbine engines, to minimize vibrations. An optimal engine balance solution is obtained using a hybrid optimization technique based on vibration data from one or more vibration sensors and corresponding influence coefficients which quantify the change in vibration level at the vibration sensors due to a unit increase in unbalance level at unbalance source locations. More specifically, balance weight and angular position are determined based on multiple optimization methods which concurrently process the vibration data, the multiple optimization methods comprising local and global optimization algorithms.

21 Claims, 8 Drawing Sheets

Example application of engine balancing equation for optimization:

$$\vec{V}_F = \vec{V}_0 + A\vec{u}$$

Note: All values used are fictitious and for illustrative purposes only $n_w = 2$ (2 tested speeds)
$n_s = 2$ (2 engine sensors)
$n_b = 1$ (1 balance plane: Fan)

Known Quantities:

$$\vec{V}_0 = \begin{bmatrix} 0.5 & 40° \\ 0.6 & 50° \\ 0.9 & 180° \\ 1.0 & 190° \end{bmatrix} = \begin{bmatrix} 0.3830 + 0.3214i \\ 0.3857 + 0.4596i \\ -0.9000 \\ -0.9848 - 0.1736i \end{bmatrix}$$

Shown as amplitude and phase for clarity

Complex form
Dimensions: 4x1 = ($n_w \times n_s$) rows x 1 column $$A = \begin{bmatrix} 0.0081 + 0.0199i \\ -0.0060 - 0.0099i \\ -0.0210 - 0.0562i \\ -0.0042 - 0.0975i \end{bmatrix}$$

Complex form
Dimensions: 4x1 = ($n_w \times n_s$) rows x $n_b$ columns

Unknown Quantities, solved by our Optimization Algorithm:

$$\vec{V}_F = \begin{bmatrix} 0.5240 & 66.5213° \\ 0.5880 & 37.7609° \\ 0.5880 & 227.0330° \\ 0.5880 & 270.3840° \end{bmatrix} = \begin{bmatrix} 0.2088 + 0.4806i \\ 0.4649 + 0.3601i \\ -0.4008 - 0.4303i \\ 0.0039 - 0.5879i \end{bmatrix}$$

Shown as amplitude and phase for clarity

Complex form
Dimensions: 4x1 = ($n_w \times n_s$) rows x 1 column

Predicted Peak Vibration reduced from 1.0 units to 0.5880 units by applying optimal fan balance weight

$$\vec{u} = \begin{bmatrix} 10.9852 & 69.7296° \end{bmatrix} = \begin{bmatrix} 3.8058 + 10.3049i \end{bmatrix}$$

Complex form
Dimensions: 1x1 = $n_b$ rows x 1 column

FIG. 9

METHODS FOR OPTIMIZED ENGINE BALANCING BASED ON FLIGHT DATA

BACKGROUND

This disclosure generally relates to systems and methods for balancing rotating machinery to reduce or minimize vibrations. In particular, the disclosed embodiments relate to systems and methods for balancing gas turbine engines.

It is either impossible or nearly impossible, as a practical matter, to build a rotating structure that is perfectly balanced upon manufacture. Any such structure will produce a certain amount of undesired vibration to a greater or lesser extent. Such vibration is usually passed through bearings that support the rotating part of the structure, and can therefore manifest itself as unwanted noise or vibration in adjacent structures. As is known to those skilled in the art, synchronous vibration may be characterized by an amplitude (i.e., magnitude) and a phase angle (i.e., direction). Thus, the vibration of a part may be represented as a vector or phasor.

One type of rotating machinery susceptible to undesired vibration is the high-bypass turbofan engine used in commercial aviation. Such engines have a large number of rotating elements. These rotating elements can be grouped according to the relative speed of rotation. Some of the rotating elements form a low-speed rotating system and other rotating elements form one or more high-speed rotating systems. More specifically, each rotating system of a gas turbine engine comprises an upstream rotating multi-stage compressor connected to a downstream multi-stage turbine by means of a shaft. The low-pressure turbine and low-pressure compressor are connected by a low-pressure shaft; the high-pressure turbine and high-pressure compressor are connected by a high-pressure shaft which surrounds a portion of the low-pressure shaft, with the high-pressure compressor and turbine being disposed between the low-pressure compressor and turbine. The fan of the turbofan engine is the first stage of the low-pressure compressor. Vibration caused by unbalances in the various stages of a turbofan engine contributes to wear and fatigue in engine components and surrounding structures, and unwanted noise in the passenger cabin of the airplane.

One way of reducing structurally transmitted vibrations is to balance the rotating systems of aircraft engines on an individual basis. Engine balancing is well known in the aircraft art. The manufacturers of turbofan engines have developed techniques for controlling the magnitude of unwanted vibration by affixing balancing mass to the engine. Typically, the fan and the last stage of the low-pressure turbine of a turbofan engine are the only accessible locations for applying balancing mass after the engine is manufactured or assembled. Internal stages are inaccessible as a practical matter.

A known method for applying balancing mass involves the selection of a combination of balancing screws from a set of screws of different standard mass, with screws being threadably inserted into respective threaded holes located around an outer periphery of an internal turbofan engine component (such as a fan spinner). For example, to achieve a balance, one or more screws of the same mass or different masses can be screwed into respective threaded holes, thereby producing a center of gravity which is closer to the axis of rotation than was the case without balancing. The total effect of multiple attached balancing masses can be determined by treating each mass and its respective location as a vector, originating at the axis of rotation, and performing a vector sum.

The specification of the location and amount of mass to be applied to a rotating system in order to balance it is referred to herein as the balance solution for the rotating system. In order to determine balance solutions for rotating systems of turbofan engines, vibration data is obtained. Vibration data is a measure of the amount of vibration that an engine is producing at various locations as the engine is operated at various speeds and through ranges of other parameters. Vibration data can be gathered at an engine balancing facility located on the ground or during flight. If accelerometers are used to capture rotating system vibration response, synchronous vibration data may be derived using a keyphasor index on the rotating system. While multiple methods known to the art can be used to capture and derive vibration data, that data should contain a displacement as well as a phase corresponding to synchronous vibration. After vibration data is obtained, the vibration data, measured at the accelerometers, and sensitivity of the accelerometers to unit weights applied at the balance locations are used to derive a balance solution that attempts to minimize the vibration of the engine producing the data.

Jet engines generate vibratory loads due to inherent imbalance on each stage of the rotating shafts which transfer through bearings to propulsion stationary structures and are transmitted through wing structures to emerge as cabin noise and vibration. Airframe manufacturers seek to keep cabin noise and vibration at low levels to ensure passenger and crew ride comfort. Typically, airframe and engine manufacturers agree on the level of engine vibration limits measured during engine runs on a test cell at two sensors before shipment to the airframe manufacturer for installation on an airplane. Normally, engine vibrations during airplane ground runs are close to the levels measured on a test cell. However, engine vibrations during flight can be much higher than ground-run levels, causing excessive cabin noise and vibration. Higher engine vibrations during flight may be caused by extra fan imbalance due to fan blade movement during flight, especially for a new generation of engines with wide-chord fan blades. As a result, subsequent flight tests may be needed and engine balancing may be performed after each one until acceptable cabin noise and vibration levels are obtained. Each flight test costs significant time and money to conduct.

It would be beneficial to provide a balancing approach which reduces the number of flight tests and balancing operations caused by the foregoing issues.

SUMMARY

The subject matter of this disclosure is a method for balancing rotating machinery (such as turbofan engines) having dynamic unbalance characteristics to minimize vibrations. The method involves operation of the rotating machinery through a representative range of operating conditions that the balance solution is to be effective over. In the case of an aircraft turbofan engine, this includes flying the aircraft on which the engine of interest is installed. The representative range of operating conditions may include operation for extended periods of time over a broad range of shaft speeds, power settings, and ambient conditions. An example of a set of aircraft flight regimes that may be suitable for satisfying the representative range of operating conditions may include aircraft taxi, engine run-up, take-off climb, level-out, cruise, descent, idle descent and landing.

In accordance with some embodiments, an optimal engine balance solution is obtained using a hybrid optimization technique based on vibration data from one or more vibration sensors and corresponding influence coefficients which quantify the change in vibration level at the vibration sensors due to a unit increase in unbalance level at unbalance source locations. More specifically, balance weight and angular position are determined based on multiple optimization methods which concurrently process the vibration data, the multiple optimization methods comprising local and global optimization algorithms.

The methods disclosed herein can be used by airframe manufacturers, engine manufacturers, and airborne vibration monitor (AVM) box developers for on-board engine balancing systems if cabin noise and vibration are deemed above acceptable limits by pilot or crew during flight operations. Balance weights could be placed by mechanics soon after an airplane has landed in the time interval before the airplane's next flight One aspect of the subject matter disclosed in detail below is a method for obtaining a balance solution for a rotating system (e.g., a gas turbine engine on an aircraft), comprising: acquiring sensor data from one or more sensors attached to non-rotating structures during operation of a rotating system; conditioning the sensor data to obtain vibration data suitable for use in engine balance analysis; and sending said vibration data to a computer system. The computer system performs the following operations: generating a plurality of balance solutions for the rotating system based, at least in part, on the vibration data from the one or more sensors, each of the balance solutions generated by a respective one of a plurality of optimization methods, and each of the balance solutions being predicted, by the respective optimization method, to minimize vibrations in the one or more vibration sensors during operation of the rotating system; and comparing the plurality of balance solutions to determine an optimal balance solution.

The step of generating the plurality of balance solutions comprises at least the following steps: generating a first balance solution using a global optimization method and generating a second balance solution using a local optimization method. In one implementation, said global optimization method comprises a simulated annealing algorithm and a pattern search algorithm that starts with a result from said simulated annealing algorithm.

In accordance with a preferred embodiment, the step of generating the plurality of balance solutions comprises generating a first balance solution using a first global optimization method, generating a second balance solution using a second global optimization method different from the first global optimization method, and generating a third balance solution using a local optimization method. In one implementation, the first global optimization method comprises a genetic algorithm, a simulated annealing algorithm that starts with a result from the genetic algorithm, and a pattern search algorithm that starts with a result from the simulated annealing algorithm; the second global optimization method comprises a simulated annealing algorithm and a pattern search algorithm that starts with a result from the simulated annealing algorithm; and the local optimization method comprises a bounded Fminsearch algorithm.

Another aspect of the subject matter disclosed in detail below is a method for balancing a rotating system, comprising: (a) attaching one or more vibration sensors to a structure that vibrates during operation of the rotating system; (b) operating the rotating system for a period of time within an operating envelope; (c) converting output from the one or more vibration sensors into vibration data points during operation, the vibration data points comprising amplitude and phase data; (d) generating a plurality of balance solutions based, at least in part, on the recorded vibration data using a plurality of computer-based optimization methods, each of the plurality of computer-based optimization methods generating a respective one of the plurality of balance solutions, and each balance solution being configured to minimize peak vibrations in the one or more vibration sensors during operation of the rotating system; (e) determining an optimal balance solution from the plurality of balance solutions; and (f) attaching to or removing from the rotating system one or more balancing masses each having a respective weight and a respective angular position in accordance with the optimal balance solution.

In accordance with the disclosed embodiments, the rotating system is a gas turbine engine on an aircraft and the operating envelope comprises varying operating conditions which influence engine vibration response. Step (a) comprises attaching a first vibration sensor on a forwardmost bearing of a low-speed shaft of the gas turbine engine and attaching a second vibration sensor on a fan frame compressor case of the gas turbine engine. Step (f) comprises attaching one or more balancing masses to or removing one or more balancing masses from a fan spinner of the gas turbine engine. However, it should be appreciated that the methodologies disclosed herein also have application in balancing of other types of rotating systems and have application to one or more balancing locations.

A further aspect of the subject matter disclosed in detail below is a vibration analyzer for analyzing vibration data points representing amplitude and phase of vibrations produced by a rotating system having a shaft, the analyzer comprising a computer system programmed to perform the following operations: (a) processing vibration data points acquired during operation of the rotating system using multiple different optimization methods which each produce a respective balance solution for minimizing peak vibrations in one or more vibration sensors during operation of the rotating system; and (b) determining an optimal balance solution from the respective balance solutions produced by the multiple different optimization methods. In one implementation, operation (a) comprises concurrently processing the vibration data points using a first global optimization method, processing the vibration data points using a second global optimization method different than the first global optimization method, and processing the vibration data points using a local optimization method; and operation (b) comprises determining which of the results of the first and second global optimization methods and the local optimization method produces the lowest simulated peak vibrations in the one or more vibration sensors.

Yet another aspect is a system onboard an aircraft for processing data from one or more vibration sensors that detect vibrations produced by a turbine engine during flight, comprising a computer system programmed to perform the following operations: (a) converting output from the one or more vibration sensors into vibration data points during operation of the turbine engine, the vibration data points comprising amplitude and phase data; (b) processing the vibration data points using multiple different optimization methods which each produce a respective balance solution for minimizing peak vibrations in the one or more vibration sensors during operation of the turbine engine; and (c) determining an optimal balance solution from the respective balance solutions produced by the multiple different optimization methods.

The preferred method disclosed below has the following advantages: (1) automatic selection of all flight data required to cover airplane flight operations; (2) reduction of vibrations at two vibration sensors; (3) use of multiple different optimization methods to arrive at an optimal balance solution based on hybrid optimization approaches, combining global and local search methods, and parallel processing to achieve faster convergence to a robust global optimum; and (4) an expected reduction in repeat flight tests caused by unbalanced engines, which will save aircraft operators significant time and cost.

Other aspects of engine balancing methods are disclosed and claimed below.

BRIEF DESCRIPTION OF THE DRAWINGS

Various embodiments will be described hereinafter with reference to the drawings.

FIG. 9 is a diagram showing an example of how an engine balancing equation can be used by a hybrid optimization program.

Reference will hereinafter be made to the drawings in which similar elements in different drawings bear the same reference numerals.

DETAILED DESCRIPTION

Various embodiments of methods for balancing gas turbine engines having dynamic unbalance characteristics will be described in this section. A person skilled in the art will appreciate that various steps of the below-disclosed methods also have application in procedures for balancing other types of rotating machinery (such as steam turbines, power trains, gas compressors, etc.).

Figure 1:
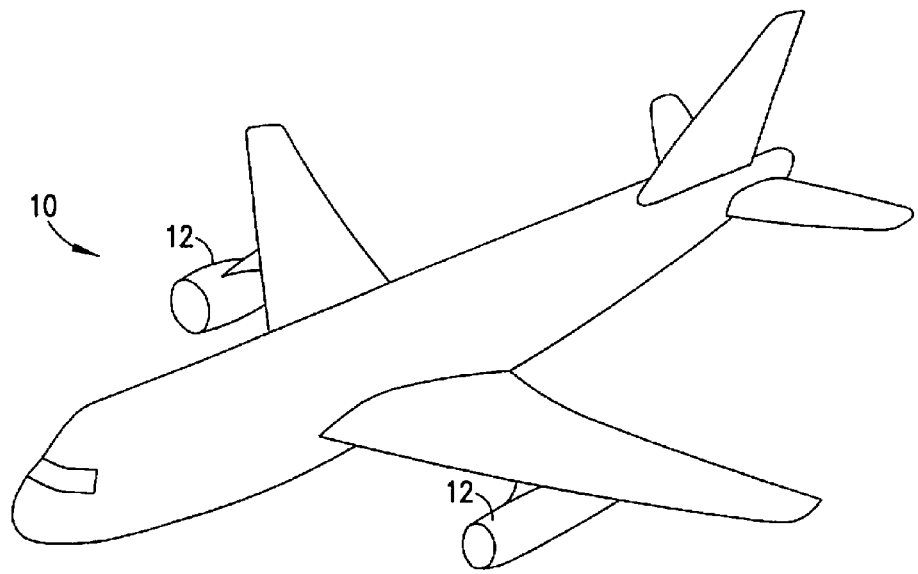
FIG. 1 is a diagram showing an isometric view of one example of an aircraft having gas turbine engines.
Figure 2:
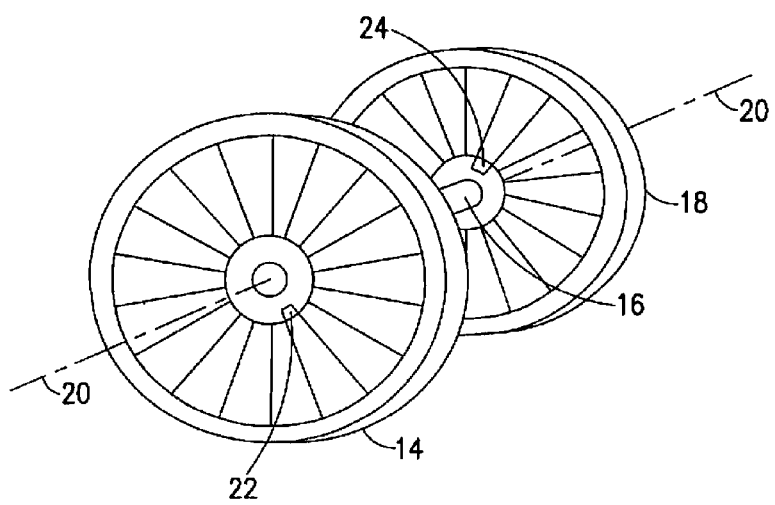
FIG. 2 is a diagram showing an isometric view of idealized rotating components of a turbojet engine.

FIG. 1 shows an aircraft 10 having a pair of gas turbine engines 12. Although the engines may be turbojet engines or turbofan engines, FIG. 2 is an idealized depiction of some rotating components of a turbojet engine. In particular, FIG. 2 shows a compressor rotor 14, a shaft 16, and a turbine rotor 18, both rotors being mounted on the shaft 16. This is just one example of a type of rotating machinery which can be balanced using the methodology disclosed hereinafter.

Due to many factors, such as manufacturing and assembly tolerances, distortion over time, and/or wear, it is unlikely that the center of mass of the compressor rotor 14 and/or turbine rotor 18 will perfectly match a geometric axis of rotation 20 of the assembly. Therefore, an attachment point 22 may be included on compressor rotor 14 and/or an attachment point 24 may be included on turbine rotor 18. Balancing masses may be added at the attachment points to balance the assembly about its axis of rotation 20. A balancing mass is intended to alter the center of mass of the rotating assembly to better align or coincide with the axis of rotation 20, thereby reducing if not minimizing vibrations.

Figure 3:
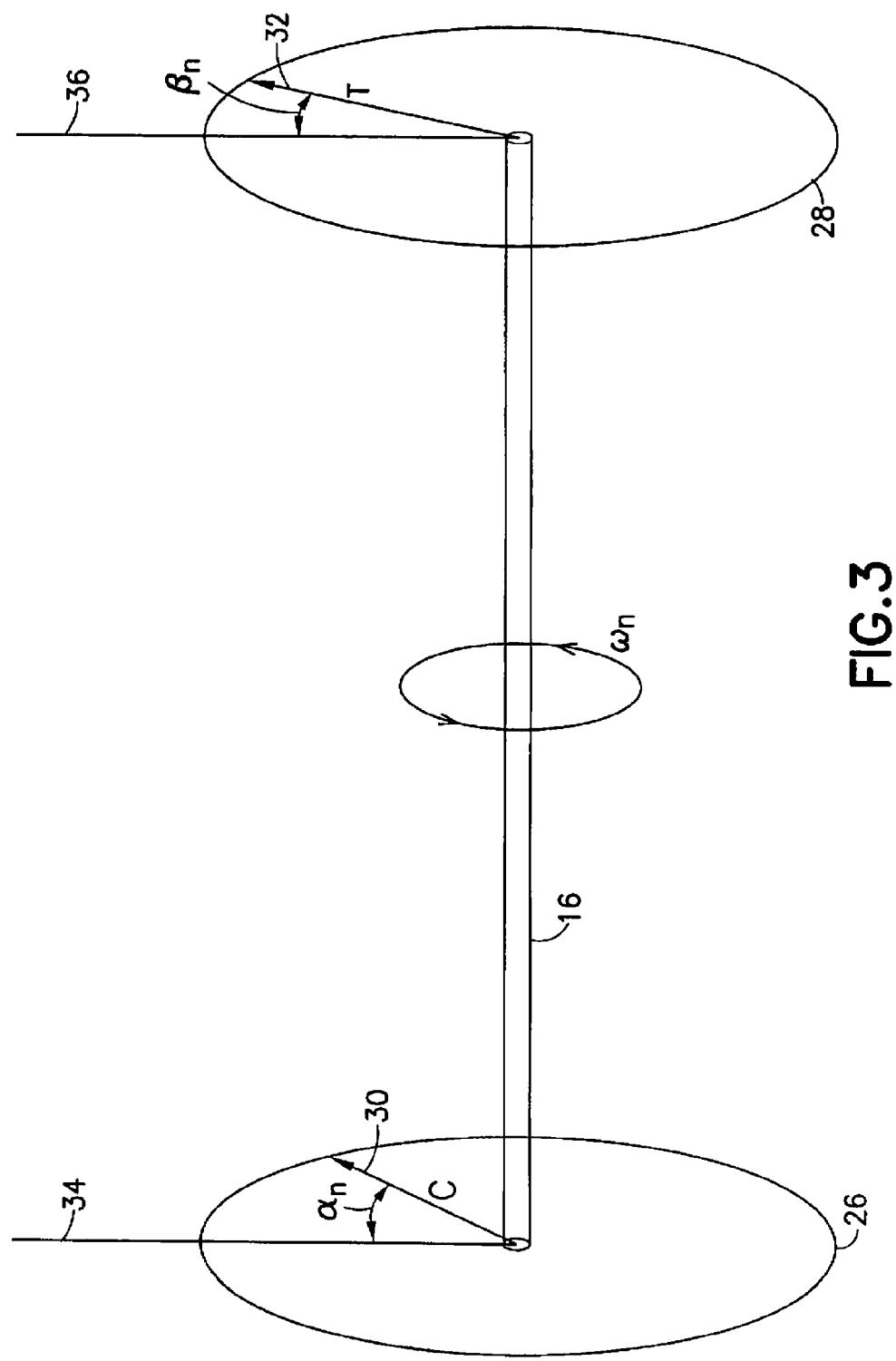
FIG. 3 is a vector diagram representing vibrations generated during rotation of the rotating components depicted in idealized form in FIG. 2.

FIG. 3 is a vector diagram depicting the forces exerted on a gas turbine engine due to vibrations of the compressor and turbine rotors. The shaft 16 is shown rotating at a speed $\omega_n$ between a forward unbalance plane 26 and an aft unbalance plane 28. The aft unbalance plane 28 corresponds to the location where a turbine rotor is located (toward the aft end of the engine) and where the vibration induced by the turbine rotor acts on the engine. For a particular instant in time, an unbalanced condition T of the turbine rotor is depicted as a vector 32. Likewise, the forward unbalance plane 26 corresponds to the location where a compressor rotor (or a fan) is located (toward the forward end of the engine) and where the vibration induced by the compressor rotor (or fan) acts on the engine. For the same particular instant in time, an unbalanced condition C of the compressor rotor is depicted as a vector 30.

The vector 30 has a magnitude and a phase angle $\alpha_n$ (relative to axis 34) at the rotational speed $\omega_n$. Similarly, the unbalanced displacement vector 32 has a magnitude and a phase angle $\beta_n$ (relative to axis 36) at the rotational speed $\omega_n$. The magnitudes and phase angles of vectors 30 and 32 can be determined using any suitable technique known in the art, for example, an influence coefficient method of balancing can be employed. The use of influence coefficients to balance aircraft engines is well known. These influence coefficients are arranged to form a sensitivity matrix that quantifies the change in vibration level at the engine vibration sensors due to a unit increase in unbalance level at unbalance source locations (e.g., at the fan).

In the case of a high-bypass turbofan engine, a known balancing method takes into account the effects of plane unbalances at the fan and the last stage of the low-pressure turbine, and other plane unbalances caused by stages that lack means for mounting balancing weights. The as-built vibration at any location in an engine is at least in part due to such unbalances, although some stages typically affect the overall unbalance more than others. The influences of unbalances in all of the stages of the rotating system can be related to the accessible stages using influence coefficients, which can be derived from the vibrational responses when different balancing mass are installed and the system is operated. These vibrational responses are measured at various shaft speeds using sensor pickups (e.g., accelerometers). In practice, any engine that has unacceptably high unbalances after manufacture can be first run on the ground to measure its as-built vibration via sensor pickups. These measurements can be taken over the engine operating range of speeds (measured in rpms). Such data may be recorded when the engine is operating at a specific shaft speed. Measurements while the engine is on the ground do not take into account certain kinds of dynamic response now identified in aircraft engines. Such dynamic responses may be obtained from vibration data collected during a variety of conditions. In the case of aircraft engines, the majority of their service life will be spent in the air, rendering data taken only from test cell or ground conditions of limited value for achieving adequate balancing.

Influence coefficients determined for a particular location are representative of a response at a balancing plane or plane of interest. Influence coefficients may be expressed as a magnitude and a phase shift having units of displacement and angle per mass-length respectively. One set of magnitude units typically used is mils double amplitude per gram-centimeter. One known method of calculating influence coefficients for such planes or stages is to use measured data from a representative baseline engine ground run, and two trial runs, where data from each trial run is obtained from sensor pickups after placing trial masses on one or both balancing planes (e.g., fan and last stage of the low-pressure turbine). Trials may be conducted for the engine operating envelope. Thus, the influence coefficients can be calculated since the actual corrective masses added during any trial run are known, and the resultant change in vibration is also known because it can be measured at the sensor pickups.

In theory, the influence coefficients for a given engine, or from one engine to another of the same type or model, should be nearly identical. However, due to nonlinearity factors, manufacturing tolerances, measurement errors, wear, distortion over time, and other factors, it has been found that a single set of influence coefficients cannot be relied on. It is known in the prior art to implement a balancing method by a simple averaging of influence coefficients calculated for a number of engines, to obtain so-called generic influence coefficients usable for most engines with some level of confidence, or more exact influence coefficients can be calculated for each engine in the above-described manner. In accordance with a known balancing procedure, a history of an engine's characteristics, including predetermined influence coefficients for trim balancing, can be updated and stored for reference when performing the balancing procedure. These influence coefficients relate vibration data amplitude and phase at specific locations and shaft speeds to the mass unbalance at a reference position.

As previously noted, in order to determine balance solutions for the rotating systems of aircraft engines, vibration data is obtained. In the balancing methods disclosed herein, vibration data is gathered during flight and, optionally, from non-flight conditions. In one embodiment of an improved balancing method, the engine is operated for a period of time under different flight regimes such as take-off, climb, level-off, cruise, descent, idle descent, etc. Operation in the different flight regimes exposes the engine to different power settings, altitudes, ambient temperatures, fan blade movement, and so forth. Such varying operating parameters influence the engine vibration characteristics, resulting in variation which can be measured for the full range of dynamic responses of interest by acquiring vibration data. The operational envelope of an engine may include time at elevated power settings, thermal loading, altitude variation, changes to rotational inertia as well as the full engine operating range for different flight regimes. For example, vibration data may be acquired for each engine throughout an entire flight of the aircraft, including takeoff, climb, cruise, descent and landing. The improved method subjects the engine to different operating conditions. For a particular speed of interest, there is typically a different vibration or accelerometer response associated with each operating condition. Multiple responses or data points are acquired for each speed or speed range of interest. The multitude of responses is more representative of in-service use or subsequent flights. The multitude of responses can be used advantageously to determine and apply a balance solution. The applied balance solution may have advantages over balance solutions that are based on single response, from a single operating condition, for each speed or speed range of interest.

Prior to describing the presently preferred embodiment of the invention, a brief description of a high-bypass jet engine of the type commonly used to power modern commercial aircraft is described followed by a brief description of electronic circuitry suitable for converting the signals produced by accelerometers mounted on an aircraft engine to detect engine vibration into displacement signals.

Figure 4:
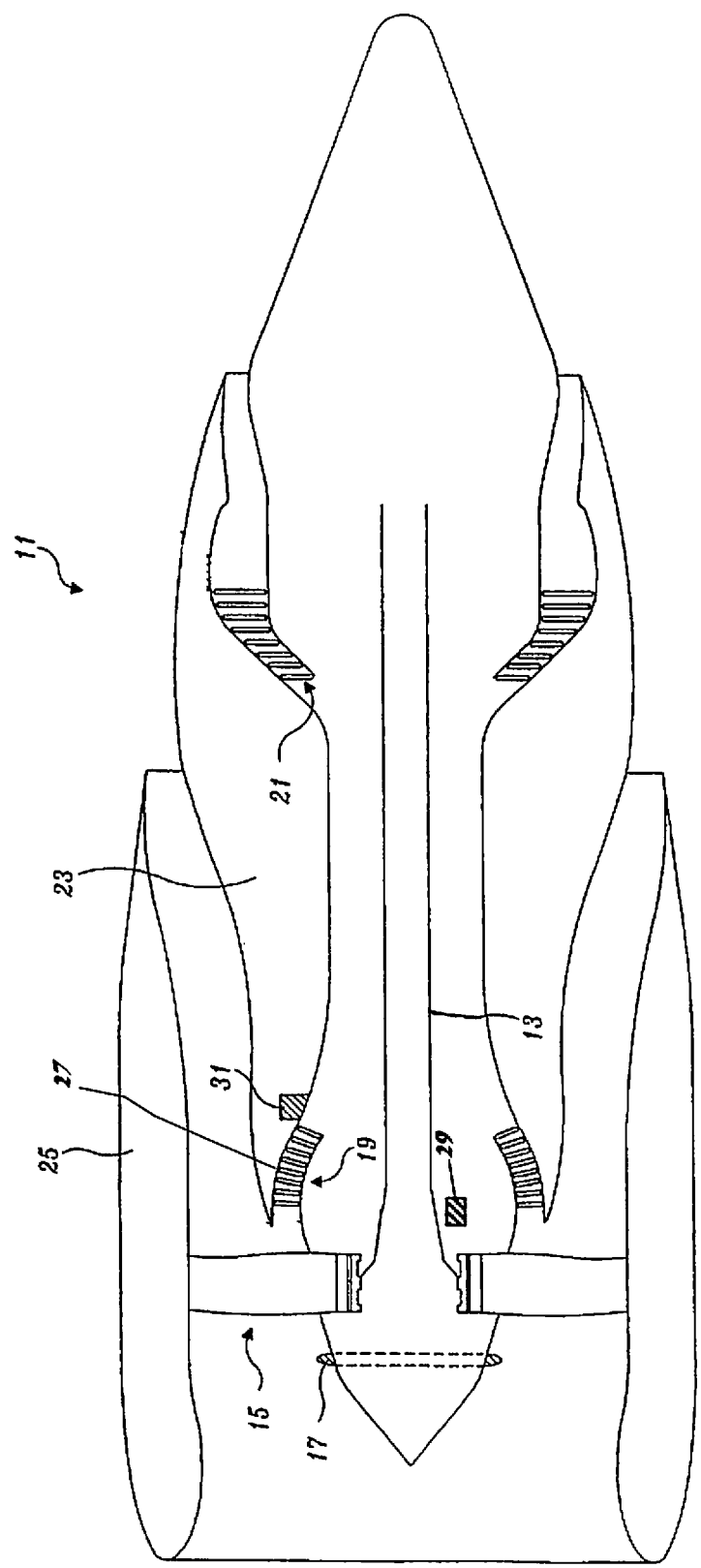
FIG. 4 is a is a side cut-away pictorial diagram of a typical high-bypass jet engine of the type used to power commercial aircraft.

FIG. 4 is a side cut-away pictorial diagram of a typical high-bypass jet engine 11 of the type used to power commercial aircraft. The high-bypass jet engine 11 includes a low-speed rotating system comprising a low-speed shaft 13, a fan 15, a fan balance ring 17, a low-pressure compressor 19, and a low-pressure turbine 21. The engine 11 also includes a high-speed rotating system, which is not shown. Because the fan 15, fan balance ring 17, low-pressure compressor 19, and low-pressure turbine 21 are all connected to the low-speed shaft 13, all of these components rotate at the same speed as the low-speed shaft 13.

The fan balance ring 17 is disposed near the forwardmost portion of the low-speed shaft 13 and is affixed thereto. The fan balance ring 17 is circular and includes a plurality of holes (not shown) distributed at equal angular intervals near its circumference. The holes form receptacles for receiving balance weights. Thus, the function of the fan balance ring 17 is to receive balance weights that aid in balancing the low-speed rotating system of the engine 11.

The fan 15 of the engine 11 is disposed immediately behind the fan balance ring 17 and is comprised of a plurality of substantially identical blades that radiate outwardly from the low-speed shaft 13 at equal angular intervals. The individual blades that comprise the fan 15 are fixedly secured to the low-speed shaft 13. Disposed behind the fan 15 is the low-pressure compressor 19. The low-pressure compressor 19 consists of a plurality of compressor blades disposed adjacent one another and radially inwardly fixedly connected to the low-speed shaft 13 and radially outwardly contained within the fan frame compressor case 27. A first engine vibration sensor 31 is attached to the engine 11 at a first location (e.g., on the fan frame compressor case 27). A second engine vibration sensor 29 is attached to the engine 11 at a second location (e.g., on the forwardmost bearing, also referred to herein as "Bearing No. 1", which bearing rotatably supports the forward end of the low-speed shaft 13). In some examples, the first and second engine vibration sensors are accelerometers.

An engine casing 23 of generally tubular shape is disposed circumferentially about the low-pressure shaft 13, extending from the low-pressure compressor 19 backward, past the low-pressure turbine 21. The engine casing 23 surrounds that portion of the engine that lies behind the fan 15. An engine nacelle 25 of generally tubular shape is disposed circumferentially about the fan 15 and a forward portion of the engine casing 23, extending from the fan 15 backward nearly to the point where the low-pressure turbine 21 is positioned. In some examples, the engine nacelle 25 may extend along some or the full length of the engine casing 23. Disposed at the forward portion of the engine casing 23 is a rotor speed sensor (not shown) that provides a signal indicative of the rotational speed of the low-speed shaft 13.

High-bypass jet engines of the type pictorially illustrated in FIG. 4 are well known in the aircraft art. Originally, the accelerometers included in aircraft engines were primarily used to provide signals to warning devices. In recent years, the signals produced by engine accelerometers have been provided to the Engine Indicator and Crew Alerting System (EICAS) of commercial jet aircraft. The EICAS alerts the crew of an engine malfunction if excessive vibration is detected. More recently, the accelerometer signals provided to the EICAS have also been utilized to provide information for use in engine balancing systems. More specifically, the accelerometer signals and electronic conditioning circuitry have been used to provide airborne vibration monitors (AVMs). AVMs produce signals that, when suitably analyzed, provide data regarding the angular position and amount of weight to be applied to the jet engines of an aircraft to balance the rotating systems of the engine. The angular position and amount of weight required to balance the rotating systems of an aircraft engine is commonly called the balance solution. The purpose of the balance solution is to reduce cabin noise as well as increase the efficiency of the engine, increase engine life, and decrease engine maintenance cost.

One example of circuitry designed to convert accelerometer outputs into signals suitable for engine balance analysis is described in U.S. Pat. No. 7,243,023. The accelerometers are connected to signal conditioning circuitry having respective channels. Each channel comprises an amplifier, a charge converter, and in most cases a pair of integrators. Typically, an accelerometer is used to measure jet engine vibrations. Accelerometers such as those found in the GE90, PW4084, and Trent 800 engines provide an acceleration signal in the form of an electric charge. The level of electric charge is indicative of the amount of acceleration the accelerometer is undergoing. Thus, the amplifiers amplify electric charges. The charge converters convert the electric charge into voltage signals. Since the front and rear accelerometers provide signals that are indicative of acceleration, in order to obtain displacement information, it is necessary to integrate the acceleration signals twice. This is accomplished by the integrators. Thus, the signals exiting from the second integrator include displacement data that is indicative of the positional displacement of the associated accelerometer. Although the use of displacement signals derived from accelerometers is typical, as will be understood by those skilled in the technology, velocity or acceleration could also be used.

In accordance with some embodiments of the enhanced engine balancing methodology disclosed herein, an optimal engine balance solution is obtained using a hybrid optimization technique based on vibration data from one or more vibration sensors and corresponding influence coefficients which quantify the change in vibration level at the vibration sensors due to a unit increase in unbalance level at unbalance source locations. More specifically, balance weight and angular position are determined based on multiple optimization methods which concurrently process the vibration data, the multiple optimization methods comprising local and global optimization algorithms.

Local search methods can be used to find a best design within a portion of a design space, usually a convex space (neighborhood). These methods include almost all of the traditional numerical and derivative-based techniques. Local search methods tend to get stuck in valleys of the design space. In contrast, global search methods can be used to find a best design within the entire design space. Global search methods tend to be robust but inefficient and expensive to run.

Figure 5:
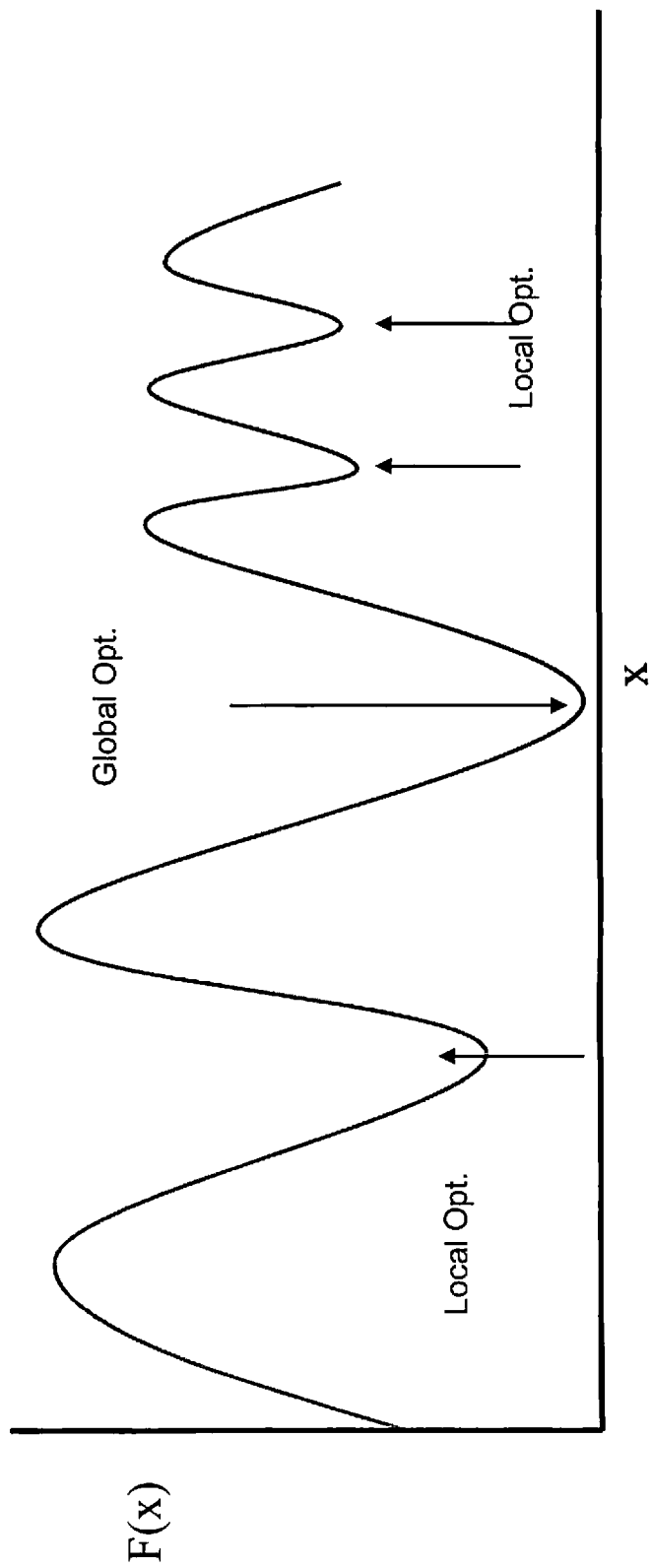
FIG. 5 is a graph of a function $F(_x)$ showing local minima or optima of the function which can be found using local search techniques and a global minimum or optimum of the function which can be found using global search techniques.

FIG. 5 is a graph of a function F(x) showing local minima or optima of the function which can be found using local search techniques and a global minimum or optimum of the function which can be found using global search techniques. As can be seen in this graph, if only a local search technique were used to find a local optimum (in this case, a local minimum), the search result might be a local optimum which is not the global optimum (i.e., the global minimum). In accordance with the methodology disclosed herein, this problem is avoided by using local search techniques in combination with global search techniques.

In accordance with one embodiment of a hybrid optimization technique, initial flight test data and generic sensitivity data (i.e., influence coefficients) are used to obtain an optimum fan solution using two vibration sensors (e.g., accelerometers) located on the forwardmost bearing of the low-speed shaft and on the fan frame compressor case. As used herein, the term "fan solution" means the weight to be added to the fan balance ring using balance weights. These weights are added by screwing them into screw hole locations around the perimeter of the fan balance ring. The fan solution represents the mass and the angular position of the weight to be added. This is a resultant balance weight vector and existing codes could be used to partition this vector into several balance weights based on the available weight sizes, angular installation positions, and limits on the number of weights desired. The algorithms used to determine the resultant balance weight vector, or fan solution, will be described in detail below with reference to FIG. 7.

During flight, samples of vibration data are acquired from each vibration sensor. A data recorder, such as a digital flight data recorder (DFDR) or an airborne vibration monitor (AVM) box, receives vibration data samples (amplitude and phase) from each vibration sensor in the sensor set along with shaft speed data from a tachometer. The sensor outputs can take the form of variable voltage or other signals, which can be converted to amplitude and phase by the AVM box (or flight data recorder).

After vibration data has been collected for the operational envelope of the engines, the data inside the AVM box or DFDR can be processed by a vibration data analyzer located onboard the aircraft (optionally, nearly in real-time) or on the ground. The analytical process disclosed herein is for a plane of unbalance of an engine to be balanced. This process can be duplicated for each accessible plane of unbalance of the engine to be balanced.

In the present context, which particular influence coefficients are selected for use will, among other factors, be a function of the engine shaft speed and which plane of unbalance needs to be balanced. For example, for a particular engine model, respective influence coefficients can be provided corresponding to respective shaft speed ranges. For each vibration data point acquired while the engine shaft speed was in a particular speed range, the respective influence coefficients will be those associated with that particular speed range or an interpolation of such influence coefficients. Influence coefficients may be expressed in vector form. An unbalance state may be determined based on a vector product of a vibration data point and a respective influence coefficient. The unbalance state can also be represented by a vector, the tip location of which can be plotted in polar coordinates.

Figure 6:
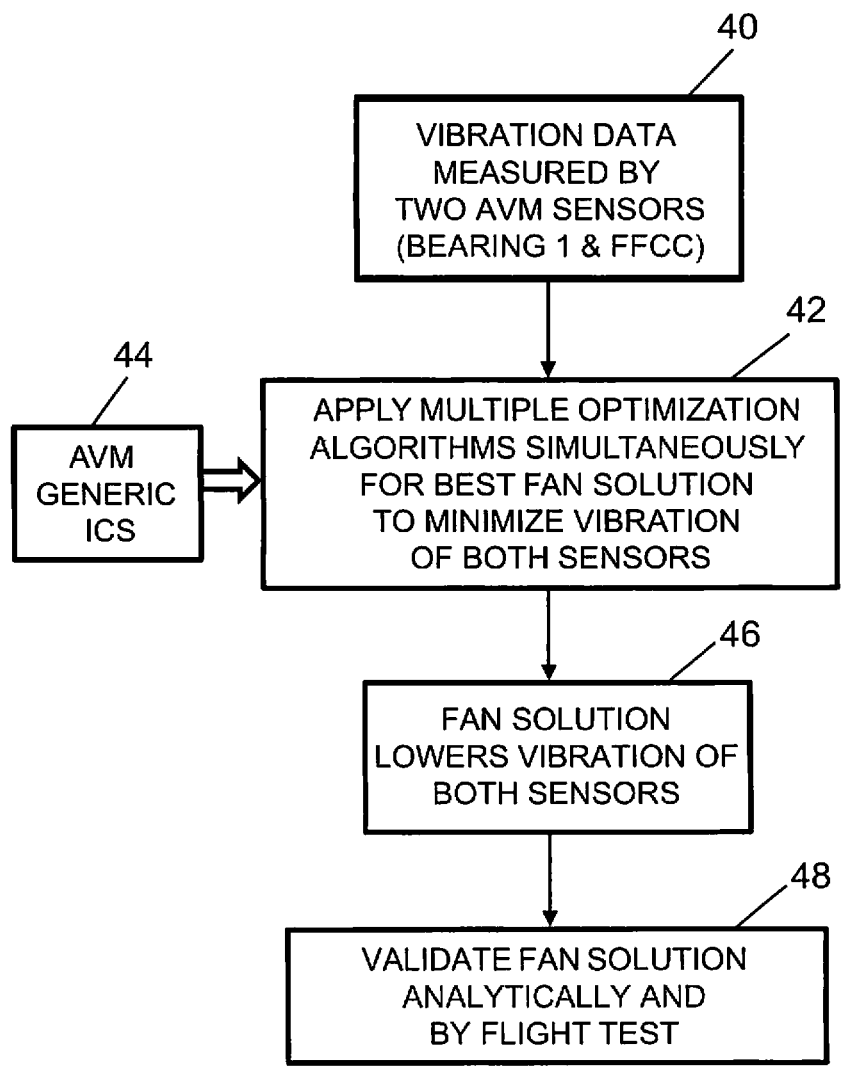
FIG. 6 is a flowchart showing steps of a method for obtaining an optimal balance solution for the fan of a turbofan engine based on vibration data from vibration sensors attached to the forwardmost bearing and the fan frame compressor case.

FIG. 6 is a flowchart showing steps of a method for obtaining an optimal balance solution for the fan of a turbofan engine in accordance with one embodiment. The method uses vibration data measured by a pair of vibration sensors (see block 40) respectively attached to the forwardmost bearing (hereinafter "Bearing No. 1 sensor") and the fan frame compressor case (hereinafter "FFCC sensor") and generic influence coefficients (see block 44). In one implementation, the optimized balance solution is based on vibration data acquired when the aircraft is flying from low to high altitudes at speeds greater than 80.7% N1. The influence coefficients may be developed based on previous flight tests. The flight test data and associated influence coefficients are read into a computer which is programmed to apply multiple optimization methods concurrently to obtain an optimal fan solution that minimizes vibrations of both sensors (step 42). This fan solution may then be implemented by adding one or more balancing weights, which weights are expected to minimize the vibrations at the Bearing No. 1 and FFCC sensors. This fan solution may optionally be validated analytically and/or by flight test (step 48). The predicted vibrations can be computed using the following equation:

Vib_predicted=Vib_flight+[Influence Coefficients]*[Balancing Weights]

Typically, the units of the influence coefficients are [mils DA]/[gm-cm]. The predicted vibrations at the Bearing No. 1 and FFCC sensors are computed using separate equations since they each have their own unique set of initial vibrations from the previous testing and a unique set of sensitivities to change in fan balance weight. The optimization method disclosed in detail below does not discriminate between the vibration data from the Bearing No. 1 and FFCC sensors when the objective is set to minimize the maximum vibrations across both sensors, which is the typical desired use case. This means that each optimization method considers vibrations at both sensors to be equally important with no preference given to one or the other.

This hybrid optimization method is flexible with regard to how the objective function is defined and has the capability to balance based on one engine vibration sensor only (i.e., either the Bearing No. 1 sensor 29 seen in FIG. 4 or the FFCC sensor 31) or both engine vibration sensors, which is a typical desired use case. In alternative embodiments, the vibration data obtained during flight testing may include vibration data from both the Bearing No. 1 and FFCC sensors and/or any other sensors used as ride comfort indicators, such as cabin microphones, seat accelerations, etc.

Figure 7:
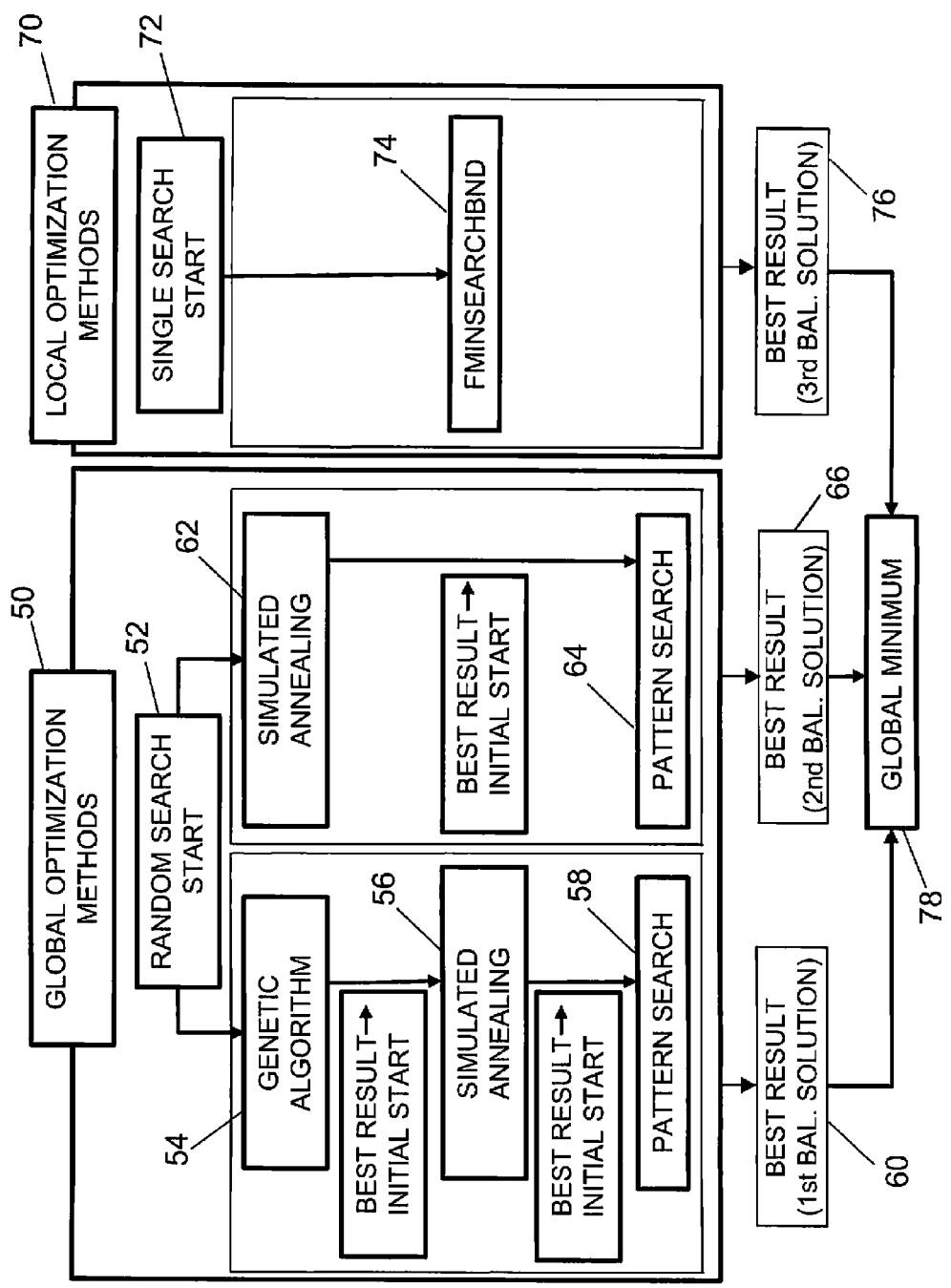
FIG. 7 is a flowchart showing steps of a hybrid optimization method for balancing a rotating system (such as a turbofan engine) in accordance in one embodiment.

FIG. 7 is a flowchart showing steps of a hybrid optimization method for balancing a rotating system (such as a turbofan engine) in accordance in one embodiment. Vibration data points from one or more vibration sensors can be concurrently processed using two different global optimization methods and a local optimization method. Then the results of the first and second global optimization methods and the local optimization method are compared to determine which result produces the lowest simulated peak vibrations in one or more vibration sensors.

Concurrently two distinct global optimization methods 50 are applied, each which starts at a random search point 52 and produces respective best results 60 and 66 that minimizes peak vibrations at the locations of the vibration sensors.

In one global optimization method, the design space is searched using a genetic algorithm 54 starting at a random search point 52. The best result from genetic algorithm 54 is used as the initial balancing weight starting point for a simulated annealing algorithm 56. The best result from simulated annealing algorithm 56 is then used as the initial balancing weight starting point for a pattern search 58, which produces a best result 60 (first balance solution). The pattern search 58 is a local search technique which refines the best result produced by the simulated annealing algorithm 56, which is a global search technique.

In the other global optimization method, the design space is searched using a simulated annealing algorithm 62 starting at a random search point 52. The best result from simulated annealing algorithm 62 is then used as the initial balancing weight starting point for a pattern search 64, which produces a best result 66 (second balance solution). The pattern search 64 refines the best result produced by the simulated annealing algorithm 56.

The local optimization method 70 starts at a specified single search point 72 and uses the fminsearchbnd algorithm 74 to find a best result 76 (third balance solution) that minimizes peak vibrations at the locations of the vibration sensors.

The best results 60, 66 and 76 from the respective optimization methods are then compared and a global minimum 78 (i.e., the optimum balance solution that minimizes peak vibrations at the locations of the vibration sensors) is determined. The global minimum 78 represents the single best balance solution.

Although the individual algorithms named in FIG. 7 are well known in the art of generating solutions to optimization problems, further explanation of each algorithm is in the Appendix for the sake of completeness.

The optimization setup disclosed above is flexible and has balancing options including: balancing at the fan only or at both the fan and the low-pressure turbine; minimizing one or more engine and other airplane responses indicative of ride comfort, such as cabin microphones and seat accelerations; biasing the balance solution toward one engine speed; and user-specified speed and altitude ranges for balancing.

It has been demonstrated analytically that the foregoing different optimization methods will vary with respect to which one produces the best result depending on the input flight data and initial balance weight start points. By choosing the best solution across all optimization methods, the probability of finding the lowest peak vibrations during flight is maximized.

Each of the foregoing optimization techniques uses the following fundamental engine balancing equation (all quantities are in complex form):

$$\vec{V}_F = \vec{V}_0 + A\vec{u}$$

The individual variables appearing in this equation are explained in the following table, which also includes matrix and vector dimensions, wherein $n_w$ is the number of speeds at which the engine is tested, $n_s$ is the number of engine sensors recording vibrations, and $n_b$ is the number of engine balancing planes:

| Variable | Description (in context of engine balancing optimization) | Dimensions |
| --- | --- | --- |
| $\vec{V}_F$ | Residual engine vibration vector<br>Unknown quantity. For engine balancing optimization, the objective is minimizing the max value of this vector (predicted peak vibration) | $(n_w \times n_s)$ rows × 1 column |
| $\vec{V}_0$ | Baseline engine vibration vector<br>Known quantity. From previous engine test (flight or on-ground) | $(n_w \times n_s)$ rows × 1 column |
| A | Influence Coefficient (Sensitivity) Matrix<br>Known quantity. This represents how much the vibration will change at each sensor when a unit balance weight is added at each balance plane | $(n_w \times n_s)$ rows × $n_b$ columns |
| $\vec{u}$ | Balance weight vector<br>Unknown quantity. For engine balancing optimization, this is the design variable vector | $n_b$ rows × 1 column |

FIG. 9 shows an example of how the engine balancing equation is used by the hybrid optimization program. Fictitious numbers are used to populate the "known" quantities and optimization code was run to solve for the unknown quantities. In this example, $n_w=2$ (two tested speeds), $n_s=2$ (two engine vibration sensors) and $n_b=1$ (one balance plane, i.e., the fan). As shown in FIG. 9, the predicted peak vibration was reduced from 1.0 units to 0.5880 units by applying optimal fan balance weight.

In accordance with an alternative embodiment, a system for processing data from one or more vibration sensors that detect vibrations produced by an engine during flight is provided onboard the aircraft. This system comprises a computer system, programmed to accept inputs 40 and 44, perform operation 42, and produce the balancing solution 46 depicted in FIG. 6. This system may take the form of an AVM box or DFDR that incorporates a vibration data analyzer. This would enable the vibration data analysis to be performed onboard the aircraft during flight.

Figure 8:
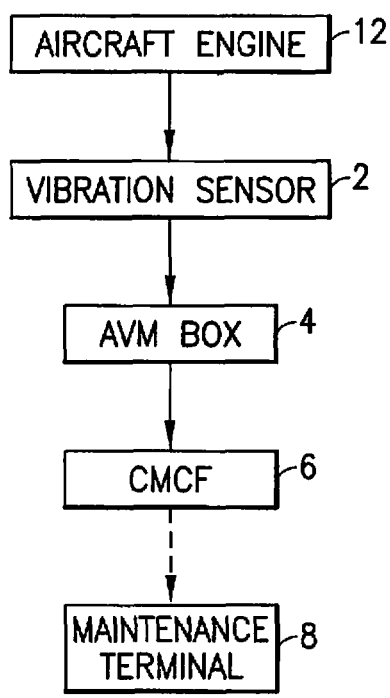
FIG. 8 is a block diagram showing components of a system for monitoring and analyzing engine vibrations during flight and then downloading the balance solution to maintenance personnel in accordance with a further embodiment.

FIG. 8 shows components of one embodiment of a system for monitoring and analyzing engine vibrations during flight and then downloading the balance solution to maintenance personnel. For the sake of illustration, the monitoring and analysis of vibrations produced by a turbofan engine 12 on an aircraft will be described. At least one vibration sensor 2 is attached to a non-rotating structure of the engine to detect vibrations produced by rotating engine components. An AVM box 4, incorporating a computer system programmed to perform the steps depicted in FIG. 6, receives the output from vibration sensor 2 (and other vibration sensors) during the flight.

It is known to provide an aircraft with a central maintenance computer function (CMCF). The CMCF encompasses major avionics, electrical, and mechanical systems installed on the aircraft. The CMCF collects, stores, and displays maintenance information generated by line commandable units. The CMCF also provides a centralized location to initiate system tests. The CMCF has operator interface display and input devices (i.e. multi-purpose control display units (MCDU)). In the embodiment depicted in FIG. 8, the output of the AVM box 4 is stored in a location accessible to a CMCF 6.

The prior art provides airline mechanics with an electronic maintenance terminal display that displays real-time CMCF data screens via MCDU emulation. A maintenance terminal 8 is typically a laptop PC comprising a cursor control device, a keyboard, an internal hard drive, a floppy diskette drive, a CD-ROM drive, and a graphical output printer bus. Using such a maintenance terminal, authorized personnel are able to access maintenance applications that supervise the aircraft's health status. The onboard network of the airplane is accessible from maintenance terminal 8 via either a wireline or wireless communication pathway. In the embodiment shown in FIG. 8, the output of the AVM box 4 can be retrieved by the CMCF 6 and downloaded to the maintenance terminal 8, where it can be viewed on a display screen.

The engine balancing analysis system may comprise a vibration analyzer for analyzing vibration data points representing amplitude and phase of vibrations produced by a rotating system having a shaft, the analyzer comprising a computer system programmed to perform the following operations: (a) processing vibration data points acquired during operation of the rotating system using multiple different optimization methods which each produce a respective balance solution for minimizing peak vibrations in one or more vibration sensors during operation of the rotating system; and (b) determining an optimal balance solution from the respective balance solutions produced by the multiple different optimization methods. In one implementation, operation (a) comprises concurrently processing the vibration data points using a first global optimization method, processing the vibration data points using a second global optimization method different than the first global optimization method, and processing the vibration data points using a local optimization method; and operation (b) comprises determining which of the results of the first and second global optimization methods and the local optimization method produces the lowest simulated peak vibrations in the one or more vibration sensors.

The balancing method disclosed herein can be used to determine where and how many balancing masses should be added to an engine or can be used to determine how existing balancing masses are to be adjusted, for example, by adding mass, by moving one or more attached masses to different locations, or by removing one or more attached masses and substituting one or more different masses at the same or different locations.

The above-described balancing methodology can be used to minimize engine vibrations across multiple vibration sensors. In the case of an airplane, this reduction in engine vibration results in decreased transmitted cabin noise and vibration levels along with decreased (cyclical) stress in the support structures. Thus, this balancing method provides an aircraft which operates more quietly and which is subject to less fatigue. Therefore, sound insulation and structural weight may be reduced. The disclosed balancing method also eliminates the cost associated with re-working aircraft engines and verification re-flights.

While various embodiments have been described, it will be understood by those skilled in the art that various changes may be made and equivalents may be substituted for elements thereof without departing from the scope of the teachings herein. For example, suitable algorithms other than those explicitly identified in FIG. 7 can be used. In addition, many modifications may be made to adapt a particular situation to those teachings without departing from the scope thereof. Therefore it is intended that scope of the claims set forth hereinafter not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude two or more steps or portions thereof being performed concurrently or to exclude any portions of two or more steps being performed alternatingly.

APPENDIX

A genetic algorithm is a method for solving both constrained and unconstrained optimization problems based on a natural selection process that mimics biological evolution. The algorithm repeatedly modifies a population of candidate solutions. At each step, the genetic algorithm randomly selects candidate solutions from a current population and uses them as parents to produce children for a next generation. Over successive generations, the population of candidate solutions evolves toward an optimal solution.

In the genetic algorithm used in the process disclosed herein, a population of candidate balance solutions to an engine balancing optimization problem is evolved toward better solutions. The evolution starts from an initial population of candidate balance solutions and is an iterative process, with the population in each iteration being called a generation. In each generation, the fitness of every balance solution in the population, as measured by the value of the residual engine vibration vector (see engine balancing equation above), is evaluated. The objective is minimizing the maximum value of the residual engine vibration vector (i.e., the predicted peak vibration of one or more vibration sensors). The more fit candidate balance solutions are stochastically selected from the current population, and each candidate balance solution's properties are modified (recombined and possibly randomly mutated) to form a new generation. The genetic algorithm uses three main types of rules at each step to create the next generation from the current population: (1) selection rules select the candidate balance solutions, called parents, that contribute to the population at the next generation; (2) crossover rules combine two parents to form children for the next generation; and (3) mutation rules apply random changes to individual parents to form children. The new generation of candidate balance solutions is then used in the next iteration of the algorithm. The genetic algorithm terminates when a satisfactory fitness level has been reached for the population.

Simulated annealing is a related global optimization technique that traverses the search space by testing random mutations on an individual solution. The simulated annealing algorithm can be used to locate a good approximation to a global optimum of a given function in a large search space. The method models the physical process of heating a material and then slowly lowering the temperature to decrease defects, thus minimizing the system energy. This is implemented in the simulated annealing algorithm as a slow decrease in the probability of accepting worse solutions as it explores the solution space. A mutation that lowers fitness is accepted probabilistically based on the difference in fitness and a decreasing temperature parameter. An annealing schedule is selected to systematically decrease the temperature as the simulated annealing algorithm proceeds. As the temperature decreases, the algorithm reduces the extent of its search to converge to a global minimum.

More specifically, at each iteration of the simulated annealing algorithm, a new candidate state (i.e., solution) is randomly generated by mutation. The distance of the new candidate state from the current candidate state, or the extent of the search, is based on a probability distribution. More specifically, the probability of making the transition from the current candidate state s to a new candidate state s' is specified by an acceptance probability function $P(e,e',T)$, that depends on the energies $e=E(s)$ and $e'=E(s')$ of the two states, and on a global time-varying parameter T called the temperature. States with a smaller energy are better than those with a greater energy.

In the context of the engine balance optimization disclosed herein, at each step the simulated annealing algorithm considers some neighboring balance weight vector $\vec{u}'$, of the current balance weight vector $\vec{u}$ and probabilistically decides between moving to balance weight vector $\vec{u}$ or staying with the current balance weight vector $\vec{u}$. The neighbors of a balance weight vector are new balance weight vectors that are produced after altering the current balance weight vector in some well-defined way. The simulated annealing algorithm accepts all neighboring balance weight vectors (i.e., mutations) that lower the maximum value of the residual engine vibration vector, but also, with a certain probability, neighboring balance weight vectors that raise that maximum value. By accepting states that raise the maximum value of the residual engine vibration vector, the algorithm avoids being trapped in local minima, and is able to explore globally for more possible solutions.

In addition or in the alternative to global searching, a local search can be used to refine the balance solution. Local search algorithms move from solution to solution in the space of candidate solutions (the search space) by applying local changes. More specifically, a local search algorithm starts from a candidate solution and then iteratively moves to a neighboring solution. This is only possible if a neighborhood relation is defined on the search space. Typically, every candidate solution has more than one neighbor solution; the choice of which one to move to is taken using only information about the solutions in the neighborhood of the current one, hence the name local search. When no improving configurations are present in the neighborhood, the local search can be stuck at a locally optimal point. Termination of the local search can be based on a time bound. Another common choice is to terminate when the best solution found by the algorithm has not been improved in a given number of steps.

A direct search algorithm searches a set of points around the current point, looking for one where the value of the objective function is lower than the value at the current point. The MATLAB Global Optimization Toolbox functions include three direct search algorithms called the generalized pattern search (GPS) algorithm, the generating set search (GSS) algorithm, and the mesh adaptive search (MADS) algorithm. All are pattern search algorithms that compute a sequence of points that approach an optimal point. At each step, the algorithm searches a set of points, called a mesh, around the current point—the point computed at the previous step of the algorithm. The mesh is formed by adding the current point to a scalar multiple of a set of fixed direction vectors called a pattern. If the pattern search algorithm finds a point in the mesh that improves the objective function at the current point, the new point becomes the current point at the next step of the algorithm. The value of the objective function either decreases or remains the same from each point in the sequence to the next.

In addition, bound constrained local optimization can be performed using the fminsearchbnd algorithm. The fminsearchbnd algorithm uses a simplex search to minimize a given function subject to constraints on the function arguments.

The invention claimed is:

1. A method for balancing a rotating system, comprising:
   (a) recording vibration data from one or more vibration sensors during operation of a rotating system;
   (b) generating a plurality of balance solutions by concurrent processing of the recorded vibration data using a plurality of different computer-based optimization methods, each of the different computer-based optimization methods generating a respective one of the plurality of balance solutions, and each balance solution being configured to minimize peak vibrations in the one or more vibration sensors during operation of the rotating system;
   (c) determining an optimal balance solution from the plurality of balance solutions; and
   (d) attaching to or removing from the rotating system one or more balancing masses each having a respective weight and a respective angular position in accordance with said optimal balance solution.

2. The method as recited in claim 1, further comprising:
   attaching one or more vibration sensors to a non-rotating structure that vibrates during operation of the rotating system;
   operating the rotating system for a period of time within an operating envelope; and
   converting output from the one or more vibration sensors into vibration data points during operation, said vibration data points comprising amplitude and phase data.

3. The method as recited in claim 1, wherein the rotating system is a gas turbine engine on an aircraft, said operating envelope comprises varying operating conditions which influence engine vibration response, and said attaching step comprises attaching a first vibration sensor on a forwardmost bearing of a low-speed shaft of the gas turbine engine and attaching a second vibration sensor on a fan frame compressor case of the gas turbine engine.

4. The method as recited in claim 3, wherein step (d) comprises attaching one or more balancing masses to or removing one or more balancing masses from a fan spinner of the gas turbine engine.

5. The method as recited in claim 1, wherein step (b) comprises concurrently processing said vibration data using a global optimization method and a local optimization method.

6. The method as recited in claim 5, wherein said global optimization method comprises a simulated annealing algorithm and a pattern search algorithm that starts with a result from said simulated annealing algorithm.

7. The method as recited in claim 1, wherein step (b) comprises concurrently processing said vibration data using a first global optimization method, processing said vibration data points using a second global optimization method different than said first global optimization method, and processing said vibration data points using a local optimization method.

8. The method as recited in claim 7, wherein said first global optimization method comprises a genetic algorithm, a simulated annealing algorithm that starts with a result from said genetic algorithm, and a pattern search algorithm that starts with a result from said simulated annealing algorithm.

9. The method as recited in claim 7, wherein said second global optimization method comprises a simulated annealing algorithm and a pattern search algorithm that starts with a result from said simulated annealing algorithm.

10. The method as recited in claim 7, wherein step (c) comprises determining which of the results of said first and second global optimization methods and said local optimization method produces the lowest simulated peak vibrations in the one or more vibration sensors.

11. The method as recited in claim 1, further comprising:
(e) pre-storing a set of influence coefficients that are characteristic of a model of the engine being balanced; and
(f) deriving influence coefficients from said set of influence coefficients,
wherein step (c) comprises vector multiplication of respective vibration data points times respective derived influence coefficients.

12. A method of obtaining a balance solution for a rotating system, the method comprising:
acquiring sensor data from one or more sensors attached to non-rotating structures during operation of a rotating system;
conditioning the sensor data to obtain vibration data suitable for use in engine balance analysis; and
sending said vibration data to a computer system which performs the following operations:
generating a plurality of balance solutions for the rotating system by concurrent processing of the vibration data from the one or more sensors using a plurality of different computer-based optimization methods, each of the balance solutions being generated by a respective one of the plurality of different optimization methods, and each of the balance solutions being predicted, by the respective optimization method, to minimize vibrations in the one or more vibration sensors during operation of the rotating system; and
comparing the plurality of balance solutions to determine an optimal balance solution.

13. The method as recited in claim 12, wherein the rotating system is a gas turbine engine on an aircraft.

14. The method as recited in claim 12, wherein generating the plurality of balance solutions comprises generating a first balance solution using a global optimization method and generating a second balance solution using a local optimization method.

15. The method as recited in claim 14, wherein said global optimization method comprises a simulated annealing algorithm and a pattern search algorithm that starts with a result from said simulated annealing algorithm.

16. The method as recited in claim 12, wherein generating the plurality of balance solutions comprises generating a first balance solution using a first global optimization method, generating a second balance solution using a second global optimization method different from the first global optimization method, and generating a third balance solution using a local optimization method.

17. The method as recited in claim 16, wherein said first global optimization method comprises a genetic algorithm, a simulated annealing algorithm that starts with a result from said genetic algorithm, and a pattern search algorithm that starts with a result from said simulated annealing algorithm.

18. The method as recited in claim 16, wherein said second global optimization method comprises a simulated annealing algorithm and a pattern search algorithm that starts with a result from said simulated annealing algorithm.

19. The method as recited in claim 16, wherein comparing the plurality of balance solutions to determine the optimal balance solution comprises determining which of the first balance solution, second balance solution, and third balance solution produces the lowest simulated peak vibrations in the one or more vibration sensors.

20. A system onboard an aircraft for processing data from one or more vibration sensors that detect vibrations produced by a turbine engine during flight, comprising a computer system programmed to perform the following operations:
(a) converting output from the one or more vibration sensors into vibration data points during operation of the turbine engine, said vibration data points comprising amplitude and phase data;
(b) concurrently processing said vibration data points using multiple different optimization methods which each produce a respective balance solution for minimizing peak vibrations in the one or more vibration sensors during operation of the turbine engine; and
(c) determining an optimal balance solution from the respective balance solutions produced by said multiple different optimization methods.

21. The system as recited in claim 20, wherein step (b) comprises concurrently processing said vibration data points using a first global optimization method, processing said vibration data points using a second global optimization method different than said first global optimization method, and processing said vibration data points using a local optimization method; and wherein step (c) comprises determining which of the results of said first and second global optimization methods and said local optimization method produces the lowest simulated peak vibrations in said one or more vibration sensors.

* * * * *